March 18, 1969 — H. R. SALTER — 3,433,337
ONE-WAY FREEWHEELING CLUTCH
Filed Dec. 16, 1966 — Sheet 1 of 2

INVENTOR.
HORACE R. SALTER,
BY
ATTORNEYS.

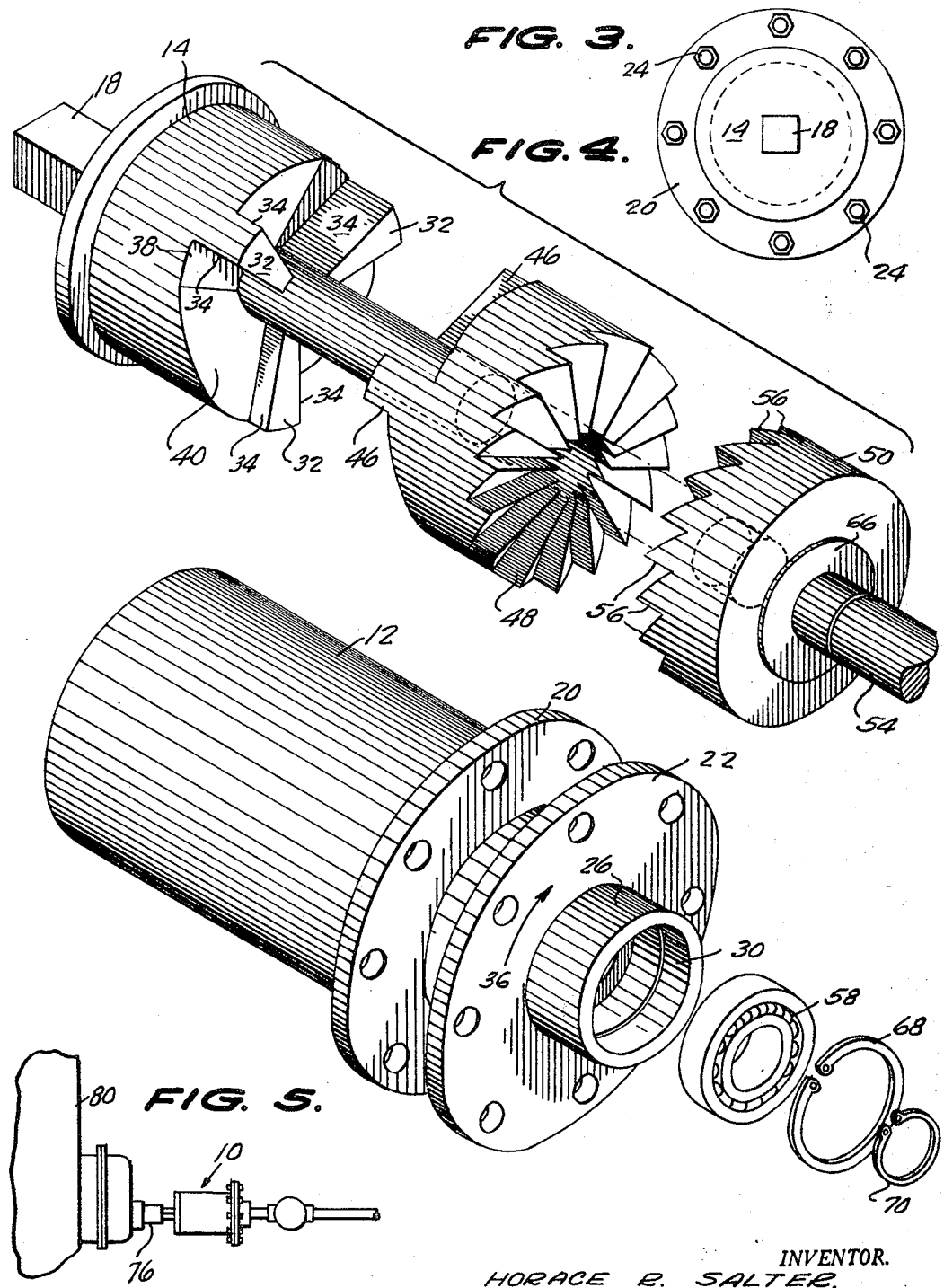

United States Patent Office 3,433,337
Patented Mar. 18, 1969

3,433,337
ONE-WAY FREEWHEELING CLUTCH
Horace R. Salter, Rte. 1, Box 40-D,
Ringgold, La. 71068
Filed Dec. 16, 1966, Ser. No. 602,402
U.S. Cl. 192—46
Int. Cl. F16d *11/00, 13/04, 41/00*
1 Claim

ABSTRACT OF THE DISCLOSURE

An over-running clutch assembly to form a freely rotating connection between driving and driven shafts, said cluch comprising: an open, rotatable shell having a closed end and means to connect said end to a driving shaft, said shell having a central interior dowel extending axially of said shell and a toothed base member surrounding said dowel and rotatable therewith; a member rotatable and slidable on said dowel, said member having teeth on each of its axial faces; a driven member rotatably mounted on the free end of said dowel and having teeth to engage one face of said member; a closure plate for the open end of said shell, said plate providing a sealed bearing for a driven shaft protruding from said driven member.

---

This invention relates to an over-running clutch assembly, the assembly being easily insertable as a connection between the power take-off of a tractor and any apparatus to be driven from the power take-off.

It is an object of this invention to provide an assembly as aforesaid which is completely automatic in operation, which may be permanently lubricated, which has a minimum relative movement of parts, which is protected against the ingress of dust by an almost hermetic seal.

It is a further object of this invention to provide an assembly as aforesaid which may easily be manufactured and assembled and which operates with a minimum of internal friction.

It is a further object of this invention to provide an assembly as aforesaid, in which the movable and connecting parts are designed for maximum strength and ruggedness and able to withstand considerable shock loads when such is necessary.

The above and other objects will be made clear from the following detailed description taken in connection with the annexed drawings, in which:

FIGURE 3 is an end elevation of the left-hand end of FIGURE 1;

FIGURE 4 is an exploded view showing, in its upper portion, the arrangement of the interior parts and in its lower portion the arrangement of the exterior parts; and FIGURE 5 is an elevation showing the assembly in place connecting the power take-off of a tractor with its apparatus to be driven.

Regardless of the type of tractor or the type of apparatus used in connection therewith, and almost regardless of the geographic location where the work is done, the tractor will be operated in a dust-laden, abrasive atmosphere. It is important therefore that any parts of the tractor operating at anything comparable to the engine speed of the tractor, so far as possible should be protected against ingress of dust. This is particularly true of parts connected to the power take-off, which is standard equipment on practically all tractors and which operates between one fourth and one third of the r.p.m. of the engine. Such devices so far as possible should not only be dust-proof but should be compact and extremely rugged since they are called upon to transmit substantial horsepower. The present invention fulfills these requirements far better than anything available heretofore.

Figure 1:
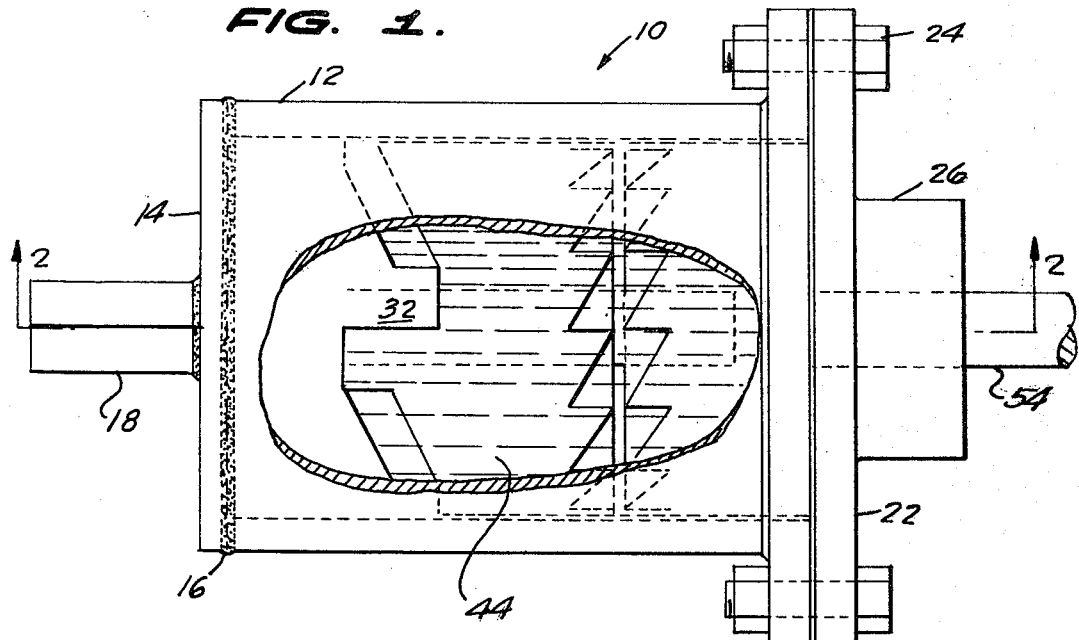
FIGURE 1 is an external view of the improved assembly, partly broken away to show some of the interior arrangements.
Figure 2:
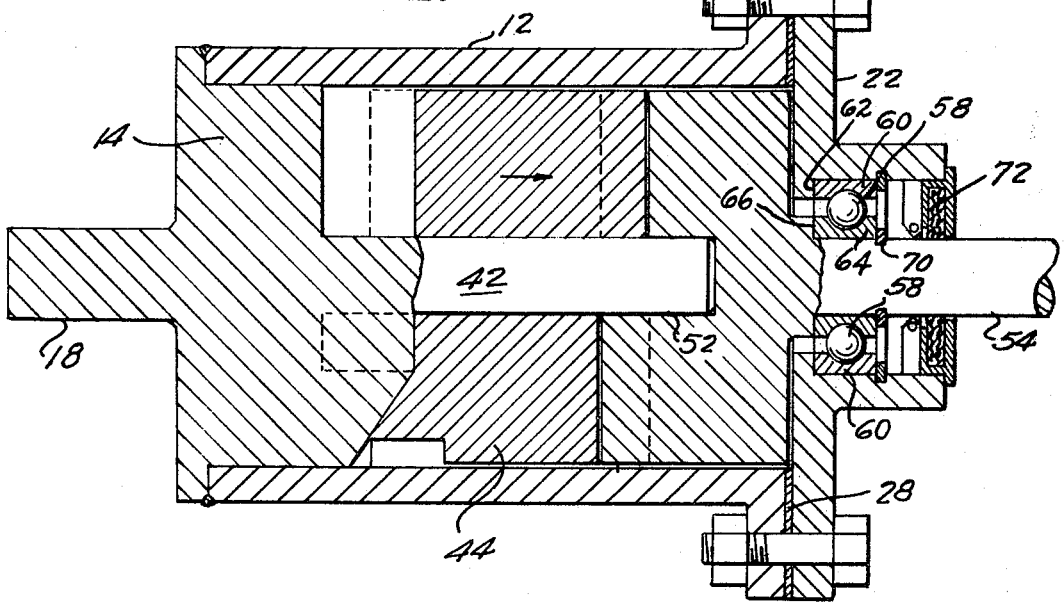
FIGURE 2 is a section on the line 2—2 of FIGURE 1.

Referring now to FIGURES 1 and 2, the over-running clutch assembly is designated generally by the reference numeral 10, and is made up of a cylindrical member 12 smoothly, integrally and axially, secured to a base member 14 by a weld 16. The base member 14 has a central external projection 18 which is given any desired cross-section for mating either with the power take-off of the tractor or a suitable adapter. At its opposite end the sleeve 12 has a flange 20. A cover plate 22 is bolted at 24 to the flange 20 and has a central boss 26 coaxial with the projection 18. When assembled, the cylinder 12, the base 14 and the cover plate 22 constitute a shell sealed by a gasket 28 between the flange 20 and the cover plate 22 and leaving a central bore 30 as the sole source of ingress for dust from the outer atmosphere.

As best shown in FIGURE 4, the base member 14 has teeth 32 formed at its inner end and each tooth 32 has radial faces 34. The base member 14 and all of its associated parts including the cylinder 12, the flange 20 and the cover plate 22, rotate in the direction of the arrow 36, as shown in FIGURE 4. Considering the indicated direction of rotation as "forward," each tooth 32 has at the base of its rearward radial face 34 an annular segment 38 and adjacent each annular segment 38 is a helical portion 40 running from the annular segment 38 to a point well below the extremity of the next adjacent tooth 32.

The base member 14 also has formed, as a functionally integral part thereof, a cylindrical dowel 42 on which is slidably mounted a clutch piece 44. The clutch piece 44 has teeth 46 equal in number to the teeth 32 and loosely mating therewith. On its opposite face the clutch piece 44 has a large number of relatively shallower ratchet teeth 48. A driven member 50 fits loosely within the cylinder 12 and has a central bore 52 which receives and has a running fit on the dowel 42. The driven member 50 is functionally integral with the shaft 54 and the member 50, the bore 52 and the shaft 54 are all coaxial with the projection 18. On its inner face the driven member 50 has formed ratchet teeth 56 which are sized and shaped to mate with the ratchet teeth 48 of the clutch piece 44.

The shaft 54 penetrates the boss 26 of the cover plate 22 and is guided and supported within the boss 26 by a ball bearing 58 which has an outer race 60 bearing on an annular shoulder 62 at the cover plate 22 and an inner race 64 bearing against an annular shoulder 66 on the driven member 50. A snap ring 68 bears in a groove in the boss 26 and secures the outer race 60 while a snap ring 70 secures the lower race 64 and bears in a groove in the shaft 54. At the outer end of the boss 26 and between it and the shaft 54 there is inserted any conventional stuffing box, labyrinth or other dust-proofing device 72.

Assume that the parts are at rest in the position shown in FIGURE 1 with the ratchet teeth 48 of the clutch piece 44 disengaged from the ratchet teeth 56 of the driven member 50. At this time the teeth 46 of the clutch piece 44 are fully engaged with the teeth 32 of the member 14. Assume now that the power take-off 76 is connected to the engine 80 (FIGURE 5) of a tractor and that the extension 18, the member 14, the cylinder 12, the flange 20, and the cover plate 22 all begin to rotate in the direction of the arrow 36 in FIGURE 3. At this moment, the helical portions 40 between the teeth 32 and member 14 act as cams and thrust clutch piece 44 to the right of its FIGURE 1 position, bringing about engagement between the teeth 48 of the clutch piece 44 and the teeth 56 of the driven member 50 as shown in FIGURE 2, without, however, disengaging the teeth 46 of the clutch piece 44 from the teeth 32 of the member 14. The result is rotation of the driven member 50 and its shaft 54.

The device of this invention is useful almost no matter what equipment is driven from the shaft 54. It has its greatest utility, however, when the shaft 54 is connected to an implement or apparatus such as a brush-hog which operates at high r.p.m. and develops a very considerable rotational inertia. During the entire period that the brush-hog is in operation, there is no relative movement between any of the parts. It will be noted in FIGURE 2 that there is substantial circumferential clearance between the clutch piece 44 and the cylinder 12 and that a similar clearance is provided between the driven member 50 and the cylinder 12. Now when, by whatever conventional means, the power take-off 76 is disconnected from the engine 80, it is most desirable that the assembly 10 cease to rotate during the relatively long period required for the rotational momentum of the brush-hog to be dissipated. Disconnection of the power take-off 76 from the engine 80 results in instant slow-down of the member 14 and its associated parts and since the driven member 50, being directly connected to the brush-hog or other apparatus continues to rotate, a camming action is set up between the inclined faces of the teeth 56 and the inclined faces of the teeth 48, which camming action tends to thrust the clutch member axially to the left of FIGURE 2, bringing about the disengagement shown in FIGURE 1.

It will be clear that the assembly as a whole has been designed for minimum wear and maximum ruggedness.

I claim:
1. An over-running clutch assembly to form a freely rotating connection between driving and driven shafts, said clutch comprising: an open, rotatable shell having a closed end and means to connect said end to a driving shaft, said shell having a central interior dowel extending axially of said shell and a toothed base member surrounding said dowel and rotatable therewith; a member rotatable and slidable on said dowel, said member having teeth on each of its axial faces; a driven member rotatably mounted on the free end of said dowel and having teeth to engage one face of said member; a closure plate for the open end of said shell, said plate providing a sealed bearing for a driven shaft protruding from said driven member.

References Cited
UNITED STATES PATENTS

| | | | |
|---|---|---|---|
| 582,822 | 5/1897 | Hubbard | 192—46 |
| 1,849,212 | 3/1932 | Winther | 192—46 |
| 2,675,899 | 4/1954 | Bonham | 192—46 XR |
| 3,217,847 | 11/1965 | Petrak | 192—67 |
| 3,306,406 | 2/1967 | Poliseo | 192—46 |

FOREIGN PATENTS 853,139    7/1949    Germany.

MARTIN P. SCHWADRON, *Primary Examiner.*

U.S. Cl. X.R.

192—112